United States Patent [19]
Winkler et al.

[11] 3,777,642
[45] Dec. 11, 1973

[54] CAMERA FOR USE WITH PERCUSSIVELY IGNITABLE FLASH LAMPS

[75] Inventors: Alfred Winkler, Munich; Peter Lermann, Narring; Guenter Fauth, Unterhaching, all of Germany

[73] Assignee: AGFA-Gevaert AG, Leverkusen, Germany

[22] Filed: Apr. 19, 1973

[21] Appl. No.: 352,537

[30] Foreign Application Priority Data
Apr. 28, 1972 Germany.................. P 22 21 041.9

[52] U.S. Cl............... 95/11 L, 95/11.5 R, 240/1.3, 431/92
[51] Int. Cl............................................ G03b 15/04
[58] Field of Search............ 95/11 L, 11 P, 11.5 R; 240/1.3; 431/92, 93, 94

[56] References Cited
UNITED STATES PATENTS
3,630,129 12/1971 Gow et al......................... 95/11.5 R
3,677,158 7/1972 Ort.................................. 95/11.5 R Primary Examiner—Robert P. Greiner
Attorney—Michael S. Striker

[57] ABSTRACT

A still camera with an indexible socket for percussively ignitable flash lamps has a composite programming device with two sections which can rotate with and relative to each other between cocked and uncocked positions. One of the sections serves to open the shutter during movement to its uncocked position and the other section serves to actuate an impeller which then fires a lamp. The absence of lamps is detected by a sensing device which moves the impeller to a retracted position and simultaneously causes the impeller to move a blocking lever into engagement with the other section of the programming device so that the other section remains idle during the making of exposures in daylight. This reduces the likelihood of camera shake because the force with which the two sections strike against one or more stops when they reach their uncocked positions is not much greater than when the one section moves alone. The impeller acts not unlike a brake to oppose the movement of the other section to its uncocked position and thus reduces the impact when the two sections move simultaneously. The sections can rotate about a common axis or about separate axes.

10 Claims, 3 Drawing Figures

CAMERA FOR USE WITH PERCUSSIVELY IGNITABLE FLASH LAMPS

BACKGROUND OF THE INVENTION

The present invention relates to photographic apparatus in general, especially to still cameras, and more particularly to improvements in cameras which can be used with mechanically actuatable sources of artificial light having one or more percussively ignitable flash lamps.

It is already known to provide a still camera with an idexible socket for multiple flash lamp holders of the type known as mechanically actuatable flashcubes, with a scanning device which engages the film and enters a perforation of the film when the latter is advanced by the length of a frame to thus prevent further actuation of the film transporting mechanism, and with a single multiple-purpose programming member which can actuate the shutter and the lamp firing mechanism and/or perform one or more additional functions, such as preventing double exposure of film frames, indexing the socket for flashcubes and/or others. The programming member is biased by a strong spring and can be held in a cocked position by the camera release element. When the release element is operated by the user of the camera, the spring is free to propel the programming member against a stop which determines the uncocked position of the programming member. The just described cameras are further provided with sensing means which can move the lamp firing mechanism to an inoperative position in response to detachment of a flashcube from the socket. Consequently, when the camera is used to make exposures in daylight, the lamp firing mechanism does not extend into the path of movement of the programming member and the latter is likely to stroke against the stop with a force which suffices to produce readily perceptible camera shake. Such camera shake can affect the quality of exposures, especially when the shutter is set to furnish relatively long exposure times. This is due to the fact that the lamp firing mechanism constitutes a device which brakes the programming member during movement toward its uncocked position so that, when such braking action is absent (when the camera is set to make exposures in daylight), the impact of the programming member against the stop is much more pronounced than when the programming member has actuated the lamp firing mechanism. The movement of the lamp firing mechanism to inoperative position when the socket is empty is desirable in order to reduce noise as well as to reduce wear upon the firing mechanism.

SUMMARY OF THE INVENTION

An object of the invention is to provide a photographic apparatus, particularly a still camera for use with percussively ignitable flash lamps, with a novel and improved programming device which is constructed, assembled and operated in such a way that it cannot cause more pronounced camera shake when the camera makes exposures in daylight than when the camera makes exposures with artificial illumination of a subject or scene.

Another object of the invention is to provide the photographic apparatus with novel and improved means for blocking the movement of a portion of the programming device during the making of exposures in daylight.

A further object of the invention is to provide a photographic apparatus of the just outlined character with novel and improved means for controlling the position of the lamp firing means in response to attachment or detachment of discrete flash lamps or groups of flash lamps from the body of the apparatus.

An additional object of the invention is to provide a photographic apparatus with means for automatically regulating the force with which parts of the programming device strike against a stop during the making of exposures with and without artificial illumination of a subject or scene.

The invention is embodied in a photographic apparatus, especially in a still camera for use with percussively ignitable flash lamps, which comprises a support (e.g., an indexible socket) for detachable flash lamps (which can be inserted individually or in groups of two or more), a programming device including first and second sections which are movable with and relative to each other between cocked and uncocked positions, biasing means for urging the sections of the programming device to uncocked positions, camera release means which normally holds the sections in cocked positions but is operable to release the sections for movement to the uncocked positions under the action of the biasing means, lamp firing means which may include an impeller movable to and from an operative position in which a portion of the impeller extends into the path of one of the sections during movement of the one section to its uncocked position whereby the impeller is actuated to fire a flash lamp, sensing means which serves to move the impeller to its operative position in response to attachment of a lamp to the support, blocking means which is responsive to detachment of a lamp from the support to thereby hold the one section against movement from its cocked position irrespective of the position of the release means, a shutter, and means for opening the shutter in response to movement of the other section to its uncocked position.

An advantage of the just described combination of parts is that the one section is allowed to leave its cocked position only when the camera carries one or more flash lamps and the impeller is ready to fire a lamp in response to operation of the release means. The impeller then produces a braking action so that the force with which the programming device strikes against a stop which determines the uncocked positions of the two sections is not much greater than when the other section moves alone to open the shutter during the making of exposures in daylight.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
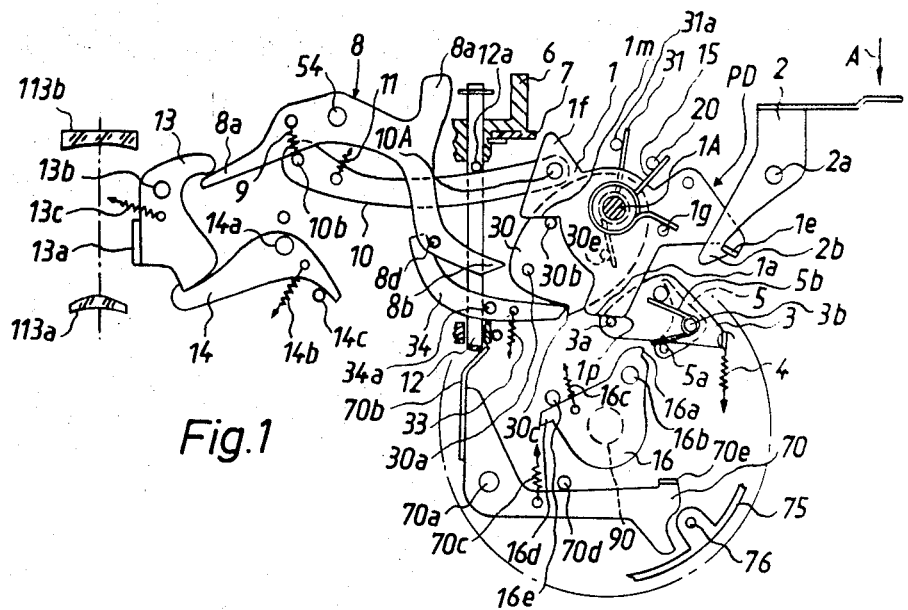
FIG. 1 is a fragmentary vertical sectional view of a still camera which embodies one form of the invention, the lamp firing means and the blocking means being shown in positions they assume when the camera is ready to make exposures in daylight.
Figure 2:
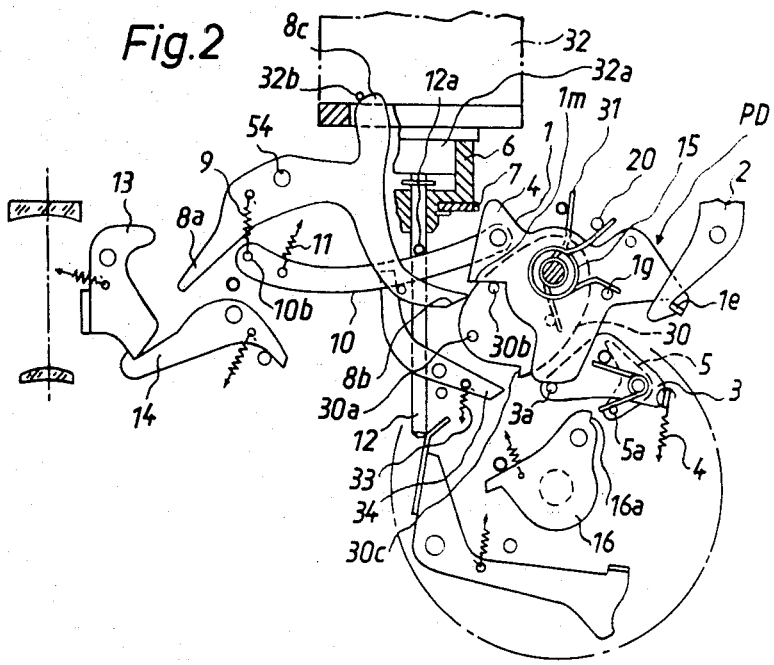
FIG. 2 is a similar sectional view but showing the lamp firing means and the blocking means in positions they assume when the camera is ready to make exposures with flash.

Referring first to FIGS. 1 and 2, there is shown a portion of a still camera including a housing or body having a top wall 7 supporting an indexible socket or support for the base 32a of a multiple flash lamp holder 32 of the type known as flashcube. The flashcube 32 is provided with four percussion ignitable flash lamps (not shown) and with four percussion wires 32, one for each flash lamp. A flash lamp is fired when the respective percussion wire 32b is disengaged from a stop (not shown) in the interior of the flashcube 32.

The housing or body of the camera contains a multiple-purpose programming device RD which is rotatable on a shaft 1A and is biased by two torsion springs 15 and 31 so that it tends to move its shoulder 1f against a firxed stop 20. The programming device PD is held in the cocked position of FIG. 1 by a camera release element 2 which is pivotable on a shaft 2a and has an inner end portion 2b engaging a lug 1e of the programming device PD. When the release element 2 is operated in response to the application of finger pressure (arrow A), its end portion 2b is disengaged from the lug 1e and the entire programming device PD is free to turn clockwise under the action of the springs 15 and 31 when the socket 6 supports a flashcube 32.

The programming device PD includes a cam 1a which is engaged by the follower 3a of a shutter driving member 3 mounted on a shaft 3b and biased clockwise by a helical spring 4 so that the follower 3a tends to remain in contact with the cam 1a. The driving member 3 carries a pivotable pawl 5 having a projection 5a adapted to strike against a shoulder 16a of the single blade 16 of a simple shutter whereby the blade 16 is propelled from the illustrated closed position and allows scene light to reach the foremost unexposed film frame by way of a light-admitting aperture 90 located behind the picture taking lens, not shown. The blade 16 is pivotable on a shaft 16b and is biased by a helical spring 16c so that it normally engages a stop 16e. The means for changing the duration of exposure times comprises a lever 70 which is pivotably mounted on a shaft 70a and has an elastic follower arm 70b extending into the path of movement of a sensing member 12 which is depressed to the position shown in FIG. 2 in response to insertion of the base 32a of a flashcube 32 into the socket 6. A spring 70c urges the lever 70 into engagement with a fixed stop 70d. The lever 70 has a projection 70e which extends into the path of movement of a projection 16d on the shutter blade 16 when the sensing member 12 assumes the position shown in FIG. 1. This provides a relatively short exposure time because the pivotal movement of the blade 16 toward its open position is terminated when the projection 16d reaches the projection 70e. The exposure time is longer when the sensing member 12 assumes the position of FIG. 2 because its inner end portion then engages the follower arm 70b and maintains the projection 70e out of the path of movement of the projection 16d. If the user wishes to make exposures with relatively long exposure times without artificial illumination of a subject or scene, an adjusting member 75 is pivoted on a shaft 76 in a counterclockwise direction, as viewed in FIG. 1, to thereby pivot the lever 70 clockwise and to move the projection 70e out of the path of movement of the projection 16d. The means for firing the flash lamps of a properly inserted flashcube 32 comprises a three-armed impeller 8 which is pivotable on a horizontal shaft 54 and whose arm 8b carries a projection or pin 8d. The arm 8a can disengage a signaling device 13 from a locking pawl 14 so that the flag 13a of the signaling device then moves into the space between the optical elements 113a, 113b of a view finder which is shown turned through 90° from its actual position. The signaling device 13 is pivotable on a shaft 13b and is biased by a spring 13c. The locking pawl 14 is pivotable on a shaft 14a and is biased by a helical spring 14b so that it normally abuts against a stop 14c. The movement of the flag 13a into the view finder indicates to the user that the flash lamp which faces the subject has been fired and that the making of the next exposure with artificial illumination of a subject or scene must be preceded by indexing of the socket 6. Such indexing preferably takes place in response to actuation of the film transporting mechanism to place the foremost unexposed film frame into register with the light-admitting aperture 90 which is normally overlapped by the shutter blade 16.

The impeller 8 is biased by a spring 9 which tends to maintain it in abutment with a projection or pin 10b on a control lever 10. The latter is fulcrumed at 10A and is biased clockwise by a helical spring 11. The control lever 10 is pivoted counterclockwise by the sensing member 12 when the latter moves into the camera body in response to insertion of a flashcube base 32a into the socket 6. The spring 11 is free to contract and to return the sensing member 12 to the position of FIG. 1 by way of the control lever 10 (which abuts against a radially extending pin 12a of the sensing member 12) as soon as the base 32a of a flashcube 32 is withdrawn from the socket 6.

The arm 8c of the impeller 8 serves to disengage the adjacent percussion wire 32b from the respective stop when the impeller assumes the operative position of FIG. 2 and is cuased to turn counterclockwise by the programming device PD. The arm 8b of the impeller 8 can receive motion from the programming device.

In accordance with a feature of the invention, the programming device PD comprises two discrete sections or parts 1 and 30. The section 30 is biased by the aforementioned torsion spring 31 and is provided with a projection or pin 30b which normally abuts against a shoulder 1m of the section 1 under the action of the spring 31. The means for cocking the programming device PD is not shown in the drawing; such means may include the aforementioned film transporting mechanism and the programming device PD can perform a number of additional functions such as directly or indirectly preventing double exposure of film frames and/or indexing the socket 6.

A pin 30a of the section 30 can move the arm 8b of the impeller 8 when the impeller assumes the operative position of FIG. 2. The camera further comprises a blocking lever 34 which is pivotable at 34a and is biased by a helical spring 33 so that one of its arms bears against the projection 8d of the arm 8b. The other arm of the blocking lever 34 can enter a notch 30c of the section 30 so that the latter is then held against movement from the cocked position.

The spring 15 reacts against the stop 20 and bears against a post 1g of the section 1. The spring 31 reacts against a stop 31a and bears against a post 30e of the section 30.

The operation is as follows:

When the socket 6 is empty and the programming device PD is cocked, the camera is ready to make exposures in daylight. An unexposed film frame is then located behind the light-admitting aperture 90 and the impeller 8 assumes the inoperative position of FIG. 1 in which the arm 8b cannot be engaged by the projection 30a of the section 30. The exposure is made in response to pivoting of the release element 2 (arrow A) so that its end portion 2b is disengaged from the lug 1e. The torsion spring 15 then rotates the section 1 clockwise and the cam 1a moves relative to the follower 3a. The angular position of the driving member 3 remains unchanged until the follower 3a is bypassed by a lobe 1p of the cam 1a; the follower 3a is then free to pivot with the driving member 3 clockwise under the action of the spring 4 whereby the pin 5a of the pawl 5 strikes against the shoulder 16a and propels the shutter blade 16 to its open position so that the aperture 90 can admit light against the foremost unexposed film frame. The pivotal movement of blade 16 in a counterclockwise direction, as viewed in FIG. 1, is terminated when the projection 16d reaches the projection 70e of the lever 70. The projection 16d is then returned to the position of FIG. 1 by the spring 16c and the exposure is terminated.

The movement of the section 1 to its uncocked position is terminated when its shoulder 1f reaches the stop 20. The section 30 cannot share the movement of the section 1 toward the uncocked position because its notch 30c receives the right-hand arm of the blocking lever 34.

If the user decides to make one or more exposures with artificial illumination of a subject or scene, the base 32a of a flashcube 32 is inserted into the socket 6 so that an unfired flash lamp faces the subject. The insertion of base 32a into the socket 6 results in movement of the sensing member 12 from the position of FIG. 1 to the position of FIG. 2 whereby the pin 12a pivots the control lever 10 counterclockwise and the spring 9 which is attached to the control lever pivots the impeller 8 counterclockwise so that the latter assumes the operative position of FIG. 2. Such pivotal movement of the impeller 8 enables the spring 33 to pivot the blocking lever 34 clockwise so that the right-hand arm of the lever 34 leaves the notch 30c and thus unlocks the section 30 of the programming device PD.

When the user thereupon operates the release element 2, the spring 31 is free to turn the section 30 so that the projection 30b remains in contact with the shoulder 1m and the projection 30a pivots the impeller 8 counterclockwise beyond the operative position of FIG. 2 whereby the impeller arm 8a disengages the percussion wire 32b from its stop and thus initiates the firing of that flash lamp which faces the subject at the exact moment when the blade 16 of the shutter allows the aperture 90 to admit scene light against the foremost unexposed film frame. The projection 30a has moved beyond the arm 8b of the impeller 8 when the shoulder 1f of the section 1 reaches the stop 20.

The impeller 8 acts not unlike a braking device to prevent the shoulder 1f from striking the stop 20 with a substantial force when the camera makes an exposure with artificial illumination of a subject or scene. Thus, by pivoting the arm 8b counterclockwise, the pin 30a of the section 30 must overcome the resistance of the percussion wire 32 as well as the bias of the spring 9 so that the acceleration of the section 30 is interrupted or reduced and the impact of the shoulder 1f against the stop 20 need not be much stronger than when the section 1 moves alone because the blocking lever 34 holds the section 30 against movement from its cocked position.

The sensing member 12 and the control lever 10 constitute parts of a simple sensing unit which can perform several functions, namely, moving the impeller 8 to the operative position of FIG. 2 in response to insertion of a flashcube base 32a into the socket 6, moving the impeller 8 to the inoperative position of FIG. 1 in response to detachment of a flashcube from the socket 6, causing the lever 34 to block the section 30 in the cocked position of FIG. 1 when the flashcube is detached from the socket 6, and disengaging the blocking lever 34 from the notch 30c of the section 30 when the flashcube 32 is reattached (or a fresh flashcube is attached) to the socket. The force with which the section 1 strikes against the stop 20 when the socket 6 is empty is furnished only by the spring 15. When the socket 6 is connected with a flashcube, the force with which the shoulder 1f strikes against the stop 20 is determined by two springs (15 and 31); however, the section 30 is then braked by the arm 8b of the impeller 8 so that the impact against the stop 20 is not much stronger than when the blocking lever 34 holds the section 30 against movement from its uncocked position. This insures that the camera can take satisfactory pictures with relatively long exposures which are not unduly affected by camera shake.

The manner in which all parts return to the positions shown in FIG. 1 or FIG. 2 when the sections 1 and 30 of the programming device PD return to the cocked positions is self-evident. For example, the arm 8a of the impeller 8 can reengage the signaling device 13 with the pawl 14 and the cam 1a of the section 1 can return the driving member 3 to its cocked position whereby the projection 5a bypasses the adjacent portion of the blade 16 by deforming a torsion spring 5b.

The improved photographic apparatus is susceptible of many modifications without departing from the spirit of the invention. Thus, the configuration of one or more parts shown in FIGS. 1 and 2 can deviate from the illustrated configuration. This applies in particular for the sections 1 and 30 of the programming device PD. Also, the programming device PD can be mounted in a different position relative to the shutter, release element and/or other camera parts, and this programming device can perform one or more additional functions, such as preventing repeated exposure of film frames. Moreover, the blocking lever 34 can be mounted in such a way that it is pivotable by the control lever 10 or by the sensing member 12 rather than by the impeller 8. The impeller then need not leave the position of FIG. 2 when the flashcube 32 is detached from the socket 6. Furthermore, the invention can be embodied in cameras which are designed to receive other types of multiple flash lamp holders or which can receive only one flash lamp at a time, preferably a percussively ignitable flash lamp.

Figure 3:
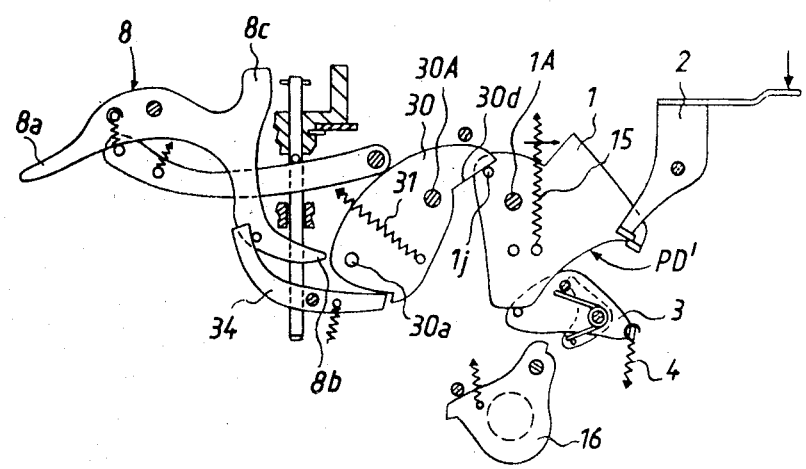
FIG. 3 is a fragmentary vertical sectional view of a modified still camera wherein the sections of the programming device are pivotable about separate axes.

FIG. 3 illustrates a further embodiment wherein all such parts which are identical with or clearly analogous to the corresponding parts of the embodiment shown in FIGS. 1–2 are denoted by similar reference characters. The difference is that the sections 1 and 30 of a modified programming device PD' are pivotable about separate parallel shafts 1A and 30A. The section 1 has a projection 1j which is tracked by an edge face 30d of the section 30. The spring 15 biases the section 1 counterclockwise and the spring 31 biases the section 30 clockwise. The section 1 can cause the driving member 3 to propel the shutter blade 16 to an open position and the section 30 can cause the impeller 8 to initiate the firing of that flash lamp (not shown) which faces the subject. The mounting and the mode of operation of the blocking lever 34 for the section 30 are the same as described in connection with FIGS. 1 and 2.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, particularly in a still camera for use with percussively ignitable flash lamps, a combination comprising a support for detachable flash lamps; a programming device including first and second sections movable with and relative to each other between cocked and uncocked positions; biasing means for urging said sections to said uncocked positions; camera release means having means for holding said sections in said cocked positions and being operable to release said sections for movement to said uncocked positions; lamp firing means movable to and from an operative position in which a portion thereof extends into the path of one of said sections during movement of said one section to said uncocked position whereby said firing means is actuated to fire a lamp; sensing means arranged to move said lamp firing means to said operative position in response to attachment of a lamp to said support; blocking means responsive to detachment of a lamp from said support to thereby hold said one section in said cocked position; a shutter; and means for opening said shutter in response to movement of the other of said sections to said uncocked position.

2. A combination as defined in claim 1, wherein said sensing means comprises a sensing member movable from a first to a second position in response to attachment of a lamp to said support and a control member movable by said sensing member in response to movement of said sensing member to said second position to thereby move said lamp firing means to said operative position.

3. A combination as defined in claim 1, wherein said lamp firing means comprises means for maintaining said blocking means in engagement with said one section in the inoperative position of said lamp firing means.

4. A combination as defined in claim 3, further comprising first resilient means for biasing said blocking means against said lamp firing means and second resilient means coupling said lamp firing means with said sensing means.

5. A combination as defined in claim 2, wherein said control means comprises a projection arranged to move said lamp firing means to said operative position in response to attachment of a lamp to said support and said lamp firing means comprises a projection arranged to move said blocking means into engagement with said one section in response to movement of said lamp firing means from said operative position.

6. A combination as defined in claim 1, wherein said biasing means comprises discrete springs for said sections of said programming device.

7. A combination as defined in claim 1, wherein said sections of said programming device are rotatable between said cocked and uncocked positions thereof about a common axis.

8. A combination as defined in claim 1, wherein each of said sections of said programming device is rotatable between said cocked and uncocked positions thereof about a separate axis.

9. A combination as defined in claim 1, wherein said biasing means comprises discrete springs for said sections of said programming device and said other section comprises abutment means which is engaged by a portion of said one section during simultaneous movement of said sections to said uncocked positions.

10. A combination as defined in claim 1, wherein said lamp firing means further comprises resilient means arranged to oppose the actuation of said lamp firing means by said one section of said programming device so that said one section is braked by said portion of said lamp firing means during movement to said uncocked position thereof.

* * * * *